US012412493B1

(12) United States Patent
Lin et al.

(10) Patent No.: US 12,412,493 B1
(45) Date of Patent: Sep. 9, 2025

(54) DRIVING SYSTEM AND METHOD TO PREVENT GLARE THEREOF

(71) Applicant: Wistron Corporation, New Taipei (TW)

(72) Inventors: Hsiu Mei Lin, New Taipei (TW); Chien Hui Yang, New Taipei (TW); Li Wei Chen, New Taipei (TW); Ming Chiuan Jing, New Taipei (TW); Hui-Chen Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/922,431

(22) Filed: Oct. 22, 2024

(30) Foreign Application Priority Data

Sep. 23, 2024  (TW) ................. 113135925

(51) Int. Cl.
G09G 3/00    (2006.01)

(52) U.S. Cl.
CPC ..... *G09G 3/001* (2013.01); *G09G 2320/0626* (2013.01); *G09G 2360/06* (2013.01); *G09G 2360/144* (2013.01); *G09G 2380/10* (2013.01)

(58) Field of Classification Search
CPC ........... G09G 3/001; G09G 2320/0626; G09G 2360/06; G09G 2360/144; G09G 2380/10
See application file for complete search history.

(56) References Cited

U.S. PATENT DOCUMENTS

| 11,557,234 | B1* | 1/2023 | Eudy ................. B60K 35/60 |
| 2009/0168185 | A1* | 7/2009 | Augustine .......... B60J 3/04 359/613 |
| 2012/0019891 | A1* | 1/2012 | Dewell ............... G02F 1/163 359/275 |
| 2017/0305349 | A1* | 10/2017 | Naboulsi ........... B60R 1/025 |

FOREIGN PATENT DOCUMENTS

CN    118330956    7/2024

* cited by examiner

*Primary Examiner* — Antonio Xavier
(74) *Attorney, Agent, or Firm* — JCIPRNET (57) ABSTRACT

A driving system is in a vehicle and includes a camera sensing an image in front of the vehicle, first and second controllers, and a light controller. The first controller is connected to the camera and identifies same- and oncoming-direction vehicles in the image. The light controller is at a windshield of the vehicle. The second controller is connected to the first controller and the light controller, analyzes the image, when a brightness is greater than or equal to a brightness threshold in an oncoming-direction vehicle position of a camera view of the oncoming-direction vehicle, converts a high-brightness position of the camera view with the brightness greater than or equal to the brightness threshold into a high-brightness position of a driving view, and controls the light controller to reduce light transmittance at the high-brightness position of the driving view. A method to prevent glare in a driving system is provided.

7 Claims, 8 Drawing Sheets

DRIVING SYSTEM AND METHOD TO PREVENT GLARE THEREOF

CROSS-REFERENCE TO RELATED APPLICATION

This application claims the priority benefit of Taiwan application serial no. 113135925, filed on Sep. 23, 2024. The entirety of the above-mentioned patent application is hereby incorporated by reference herein and made a part of this specification.

BACKGROUND OF THE INVENTION

Field of the Invention

The invention relates to a driving system and a method to prevent glare thereof.

Description of Related Art

With the advancement of driving systems such as autonomous driving techniques, Advanced Driver Assistance Systems (ADAS), and adaptive lighting techniques, the safety of driving vehicles on the road has been greatly improved. However, these driving systems still may not avoid the danger caused by the strong light generated by an oncoming-direction vehicle driving in the opposite lane. In addition to causing the driver to temporarily lose their clear perception of the road conditions and surrounding objects, the strong light produced by the oncoming-direction vehicle also makes the driver need more reaction time to deal with sudden traffic conditions, such as a same-direction vehicle ahead stopping in the lane. Therefore, new driving systems still need to be developed to deal with the issues caused by the strong light generated by the oncoming-direction vehicle.

SUMMARY OF THE INVENTION

The invention provides a driving system and a method to prevent glare thereof that may reduce the interference of sudden strong light in a driving view.

An embodiment of the invention provides a driving system configured to be disposed in a vehicle. The driving system includes a camera, a first controller, a light controller, and a second controller. The camera is configured to sense an image in front of the vehicle. The first controller is electrically connected to the camera and configured to identify a same-direction vehicle and an oncoming-direction vehicle in the image. The light controller is configured to be disposed at a windshield of the vehicle. The second controller is electrically connected to the first controller and the light controller. The second controller analyzes the image, and when a brightness is greater than or equal to a brightness threshold in an oncoming-direction vehicle position of a camera view of the oncoming-direction vehicle, coordinately converts a high-brightness position of the camera view with the brightness greater than or equal to the brightness threshold into a high-brightness position of a driving view, and then controls the light controller to reduce a light transmittance at the high-brightness position of the driving view.

An embodiment of the invention provides a method to prevent glare in a driving system, including the following steps. An image in front of a vehicle is sensed. A same-direction vehicle and an oncoming-direction vehicle in the image are identified. The image is analyzed, and when a brightness is greater than or equal to a brightness threshold in an oncoming-direction vehicle position of a camera view of the oncoming-direction vehicle, a high-brightness position of the camera view with the brightness greater than or equal to the brightness threshold is coordinately converted into a high-brightness position of a driving view, and then the light controller is controlled to reduce a light transmittance at the high-brightness position of the driving view.

Based on the above, in the driving system and the method to prevent glare thereof of an embodiment of the invention, when the brightness is greater than or equal to the brightness threshold in the oncoming-direction vehicle position of the camera view of the oncoming-direction vehicle, coordinate conversion is performed, and then the light controller is controlled to reduce the light transmittance at the high-brightness position of the driving view. Therefore, the driving system and the method to prevent glare thereof may improve visual clarity while reducing visual interference from strong light, thereby shortening driving reaction time and improving driving concentration, and thereby reducing the risk of traffic accidents and increasing driving safety.

DESCRIPTION OF THE EMBODIMENTS

Figure 1:
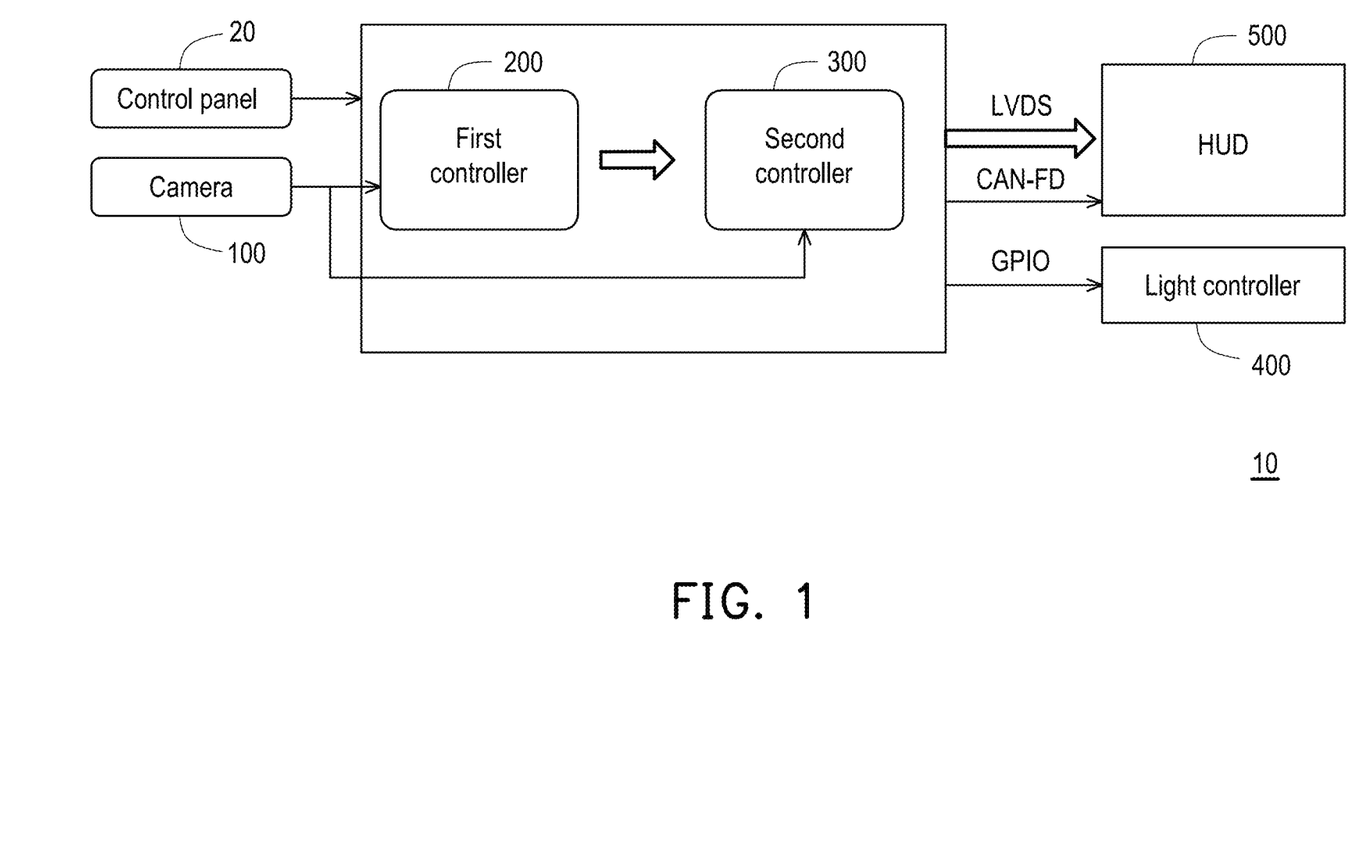
FIG. 1 is a schematic diagram of a driving system according to an embodiment of the invention.

FIG. 1 is a schematic diagram of a driving system according to an embodiment of the invention. Please refer to FIG. 1. An embodiment of the invention provides a driving system 10 configured to be disposed in a vehicle. The driving system 10 includes a camera 100, a first controller 200, a light controller 400, and a second controller 300.

In the present embodiment, the camera 100 may be a light sensor such as a complementary metal-oxide semiconductor (CMOS), a charge-coupled device (CCD), or a photodiode, but the invention is not limited thereto.

In the present embodiment, the first controller 200 and the second controller 300 include, for example, a central processing unit (CPU), a microprocessor, a digital signal processor (DSP), a programmable controller, a programmable logic device (PLD), or other similar devices or a combination of the devices, but the invention is not limited thereto. In addition, in an embodiment, each function of the first controller 200 and the second controller 300 may be implemented as a plurality of program codes. The program codes are stored in one memory unit, and the first controller 200 and the second controller 300 execute the program codes. Alternatively, in an embodiment, each function of the first controller 200 and the second controller 300 may be implemented as one or a plurality of circuits. The invention is not limited to using software or hardware to implement each function of the first controller 200 and the second controller 300. In addition, in another embodiment, the first controller 200 and the second controller 300 may also be integrated into a single controller, such as a device composed of high performance computing (HPC) such as a supercomputer and a computer cluster.

Figure 2A:
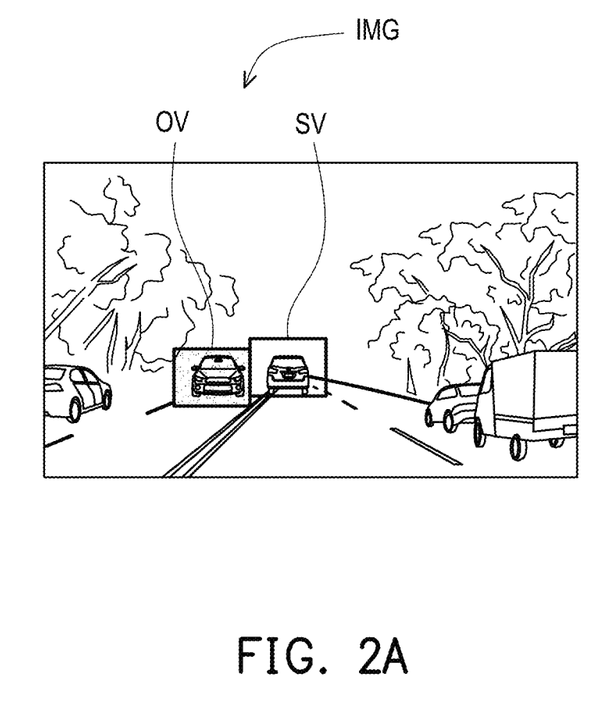
FIG. 2A to FIG. 2D are schematic diagrams of a driving system controlling a light controller to reduce a light transmittance at a high-brightness position of a driving view according to an embodiment of the invention.

FIG. 2A to FIG. 2D are schematic diagrams of a driving system controlling a light controller to reduce a light transmittance at a high-brightness position of a driving view according to an embodiment of the invention. Please refer to FIG. 1 to FIG. 2D. In the present embodiment, the camera 100 is configured to sense an image IMG in front of the vehicle. The first controller 200 is electrically connected to the camera 100 and configured to identify a same-direction vehicle SV and an oncoming-direction vehicle OV in the image IMG, as shown in FIG. 2A. In an embodiment, the first controller 200 may be implemented as an ADAS, but the invention is not limited thereto.

In the present embodiment, the light controller 200 is configured to be disposed at a windshield of the vehicle. In particular, the light controller 200 is, for example, a photochromic layer, a thermochromic layer, a photochromic glass, or a thermochromic glass. In a preferred embodiment, the light controller 200 may be an electrochromic layer or an electrochromic glass. In addition, as shown in FIG. 1, the second controller 300 is electrically connected to the light controller 200 via, for example, a general-purpose input/output GPIO, but the invention is not limited thereto.

Figure 2B:
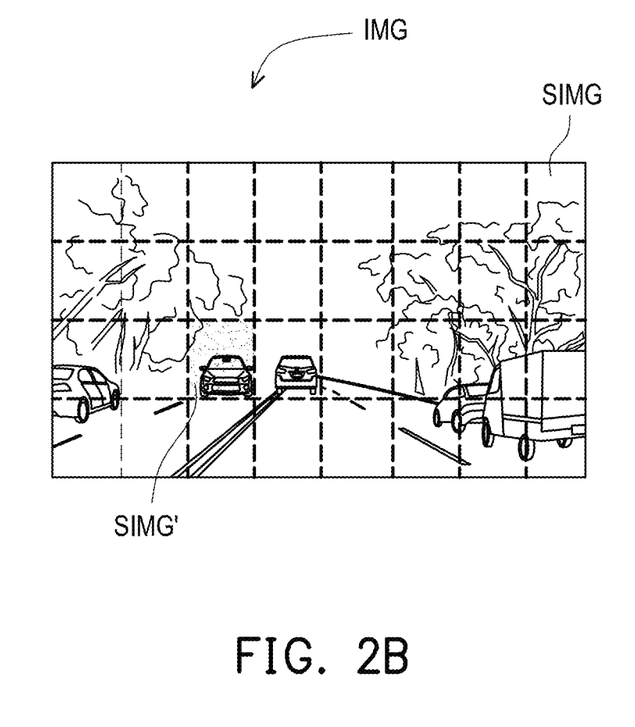

In the present embodiment, the second controller 300 is electrically connected to the first controller 200 and the light controller 400. The second controller 300 analyzes the image IMG, and when the brightness is greater than or equal to the brightness threshold in the oncoming-direction vehicle position of the camera view of the oncoming-direction vehicle OV, the high-brightness position (such as the position of a sub-image SIMG' in a plurality of sub-images SIMG of FIG. 2B) of the camera view with the brightness greater than or equal to the brightness threshold is coordinately converted into a high-brightness position of the driving view, and then the light controller 400 is controlled to reduce the light transmittance (for example, the light transmittance of a sub-light controller 420' in a plurality of sub-light controllers 420 of FIG. 2D is lowered) at a high-brightness position of the driving view.

In the present embodiment, the light controller 400 may include p×q sub-light controllers 420, wherein p≥2 and q≥2. For example, FIG. 2D illustrates that the light controller 400 includes 4×8 sub-light controllers 420. When the image IMG is analyzed, the second controller 300 (corresponding to the quantity of the light controller 420) divides the image IMG into p×q sub-images SIMG, as shown in FIG. 2B, and then controls the sub-light controller 420' corresponding to the sub-image SIMG' with a light intensity standard deviation greater than the brightness threshold to reduce the light transmittance when the light intensity standard deviation in the sub-images SIMG is greater than the brightness threshold. In particular, $$\sigma = \sqrt{\frac{\sum_{x=1,y=1}^{n,m}(b(x, y) - \bar{m})^2}{nm}},$$

-continued
$$\bar{m} = \frac{\sum_{x=1,y=1}^{n,m}(b(x, y))}{nm},$$

wherein in each of the sub-images IMG, σ is the light intensity standard deviation, b(x,y) is a light intensity of each pixel position, $\bar{m}$ is an average light intensity, and n×m is a sum of pixel quantity. For example, the brightness threshold is set to the range of 200 cd/m² to 500 cd/m².

Figure 2C:
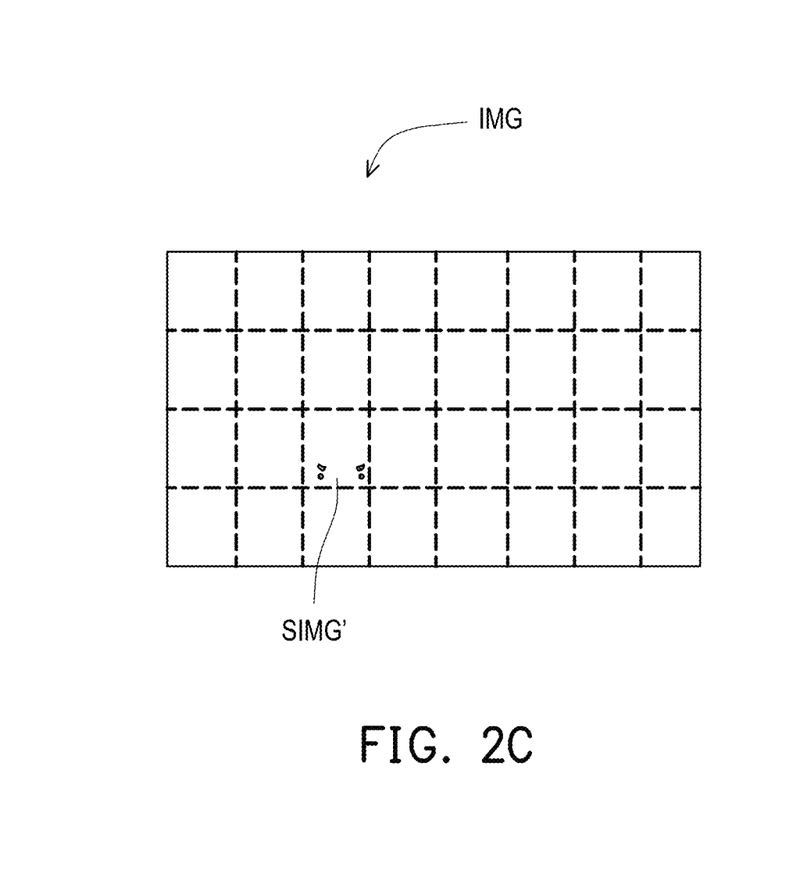
Figure 2D:
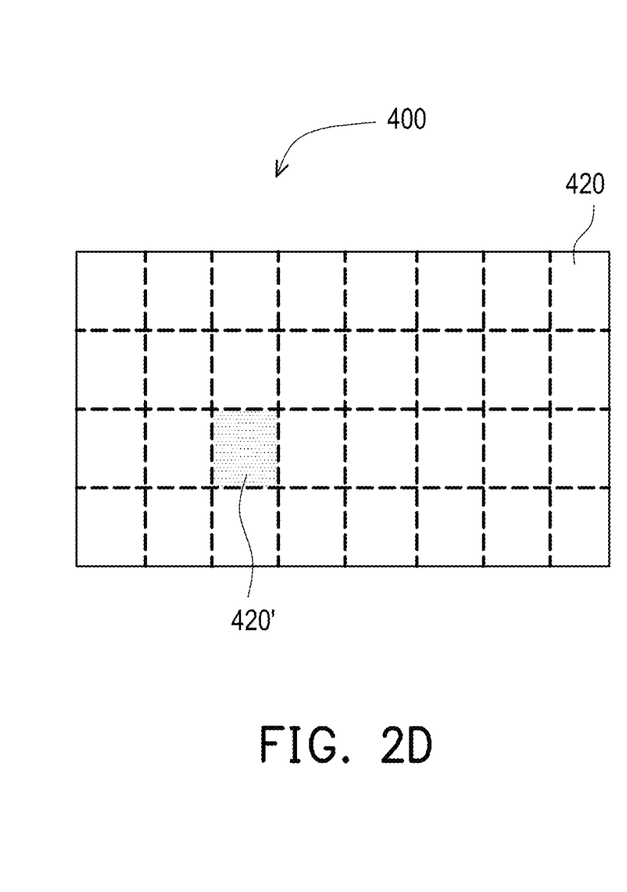

In an embodiment, the second controller 300 binarizes the image IMG, as shown in FIG. 2C, and then determines whether a brightness is greater than or equal to the brightness threshold in the oncoming-direction vehicle position of a camera view of the oncoming-direction vehicle OV. For example, in FIG. 2A or FIG. 2B, the pixel with a brightness value exceeding the threshold is set to 1, the pixel with a brightness not exceeding the threshold is set to 0, and the pixel set to 1 is rendered in black (usually 0 is rendered in black and 1 is rendered in white. However, for ease of illustration, FIG. 2C is presented in a reversed manner), thus producing FIG. 2C.

Figure 3A:
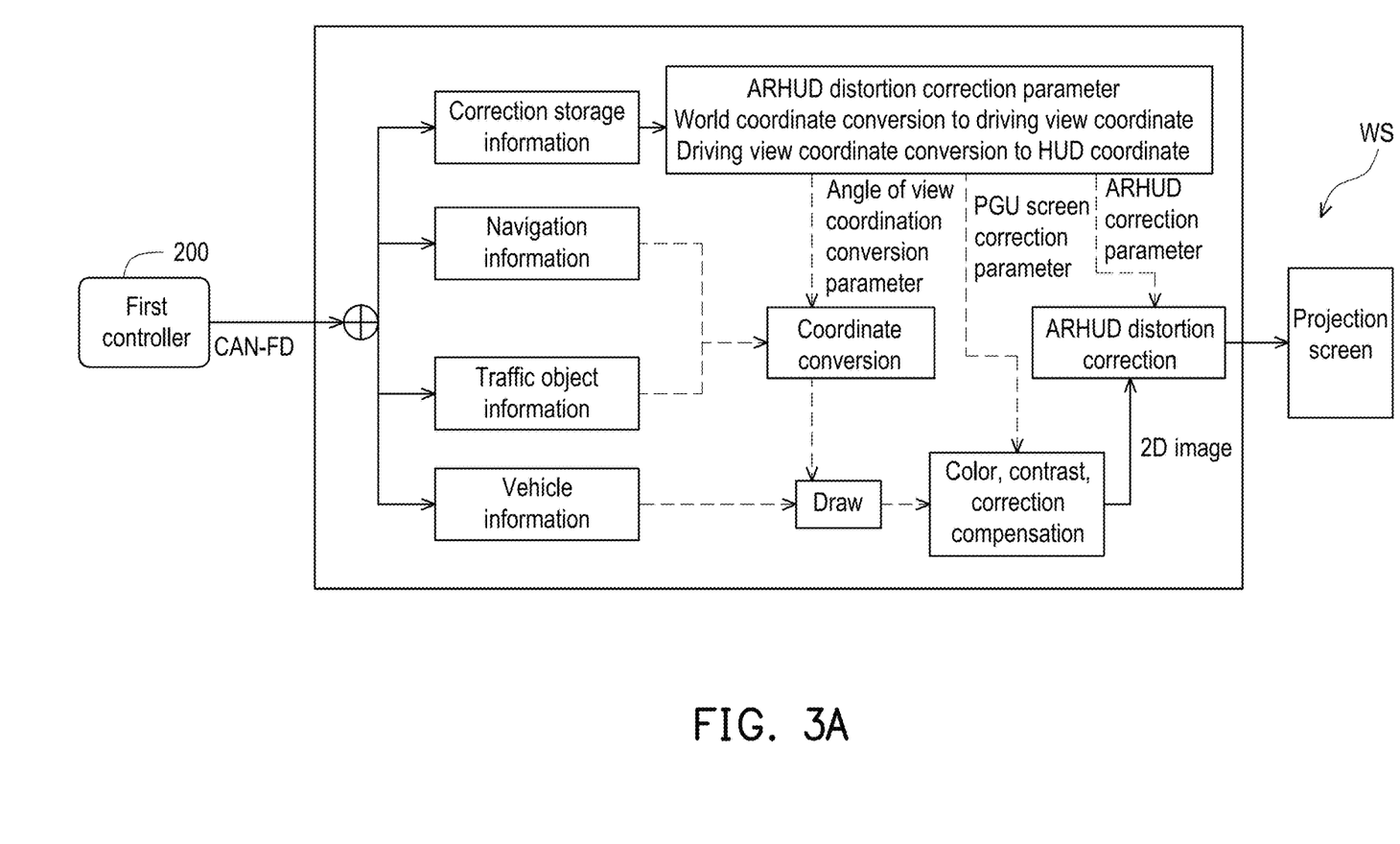
FIG. 3A to FIG. 3B are schematic diagrams of a driving system controlling a head-up display to project a sign of a same-direction vehicle and an oncoming-direction vehicle according to an embodiment of the invention.
Figure 3B:
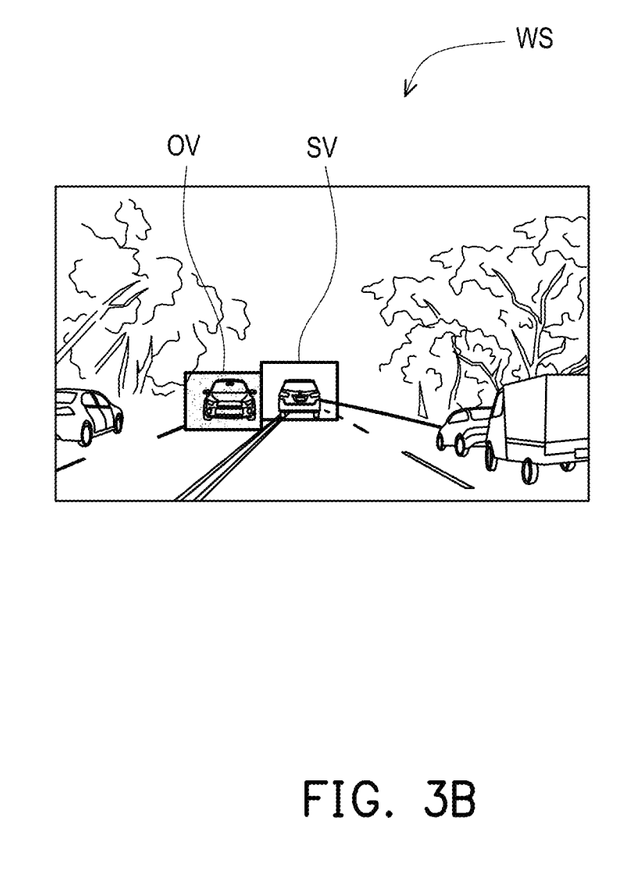

FIG. 3A to FIG. 3B are schematic diagrams of a driving system controlling a head-up display to project a sign of a same-direction vehicle and an oncoming-direction vehicle according to an embodiment of the invention. Please refer to FIG. 1 and FIG. 3A to FIG. 3B. In the present embodiment, the driving system 10 further includes a head-up display 500. The head-up display 500 is electrically connected to the second controller 300. The second controller 300 coordinately converts a same-direction vehicle position of a camera view and an oncoming-direction vehicle position of the camera view of the same-direction vehicle SV and the oncoming-direction vehicle OV into a same-direction vehicle position of a driving view and an oncoming-direction vehicle position of the driving view, and then controls the head-up display 500 to project a sign of the same-direction vehicle SV and the oncoming-direction vehicle OV at the same-direction vehicle position of the driving view and the oncoming-direction vehicle position of the driving view at a windshield WS, as shown in FIG. 3B.

In an embodiment, the head-up display 500 may be an augmented reality head-up display (AR HUD) system. The head-up display 500 includes, for example, a control unit composed of a microcontroller (MCU), a picture generation unit, and an optical engine (such as a projector). In addition, the first controller 200 and the second controller 300 are electrically or signally connected to the head-up display 500 by, for example, a method such as low voltage differential signaling technique interface LVDS or controller area network flexible data-rate (CAN-FD).

As shown in FIG. 3A, the head-up display 500 may generate a projection screen at the windshield WS according to correction storage information, navigation information, traffic object information, and vehicle information. In particular, the correction storage information includes, for example, a coordinate conversion parameter and a distortion correction parameter. The navigation information includes, for example, GPS (Global Positioning System) navigation tracks, navigation text, the GPS location of the vehicle, and the original data of the vehicle. The traffic object information includes, for example, vehicle information, categories, lane line information, signal information, pedestrian zebra crossing information, etc. The vehicle information includes, for example, vehicle speed, tire pressure, etc.

The information from the first controller 200 includes the image IMG and the information of the same-direction vehicle SV and the oncoming-direction vehicle OV. The information of the image IMG, the same-direction vehicle SV, and the oncoming-direction vehicle OV may undergo coordinate conversion via the above correction storage information, navigation information, and traffic object information. In particular, coordinate conversion may be completed by a parameter including, for example, an ARHUD distortion correction parameter, a world coordinate conversion to driving view coordinate, and a driving view coordinate conversion to HUD coordinate. Then, the processes of drawing, color, contrast, correction compensation, and ARHUD distortion correction are performed to generate a projection screen.

Please refer to FIG. 1 again. In addition, the driving system 10 may further include a control panel 20. The control panel 20 is configured to make the system enable/turn off glare prevention. The control panel 20 is, for example, an in-vehicle infotainment system panel.

Figure 4:
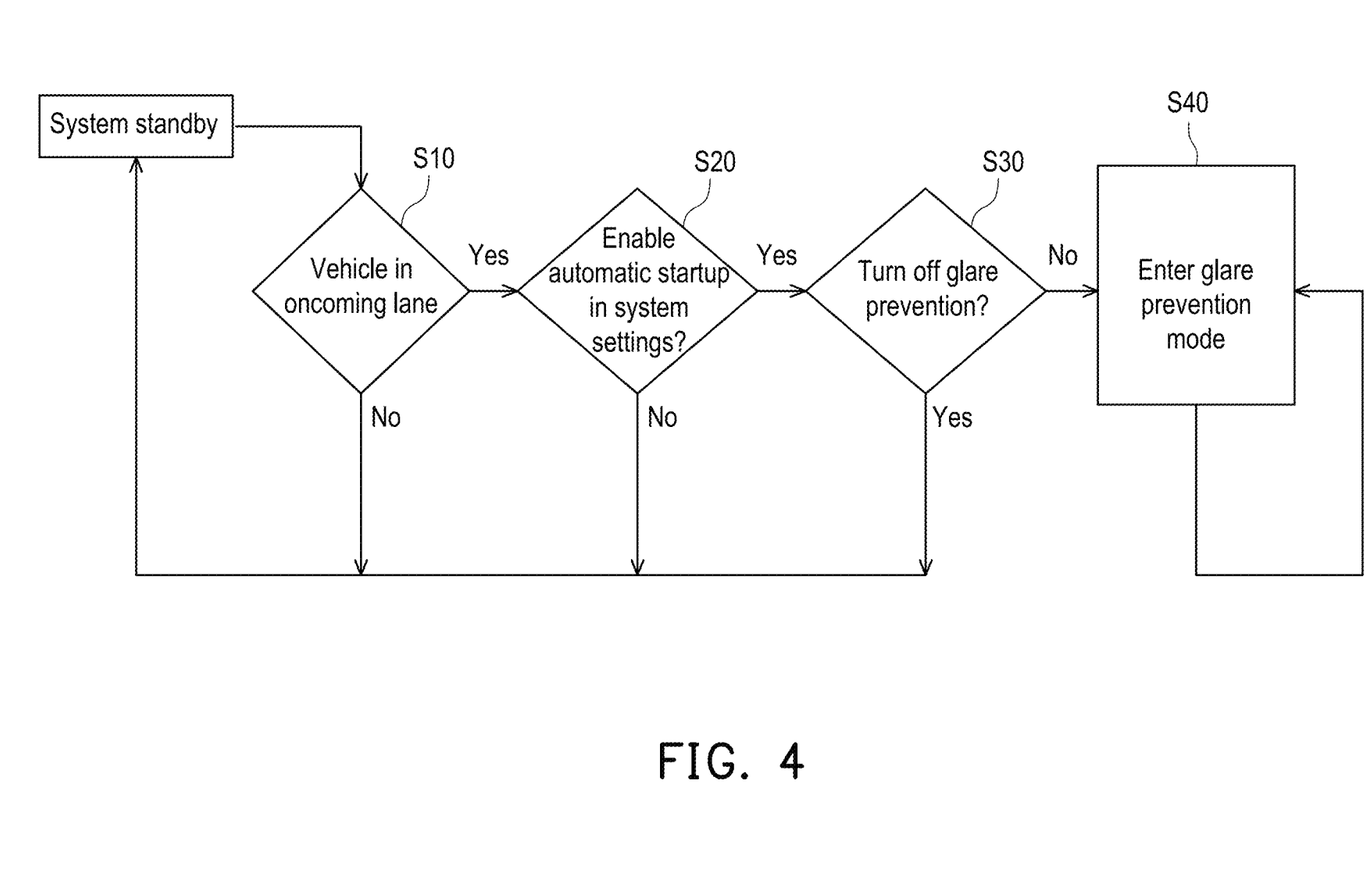
FIG. 4 is a flowchart of a method to prevent glare in a driving system according to an embodiment of the invention.

FIG. 4 is a flowchart of a method to prevent glare in a driving system according to an embodiment of the invention. Please refer to FIG. 4. An embodiment of the invention provides a method to prevent glare in a driving system, including the following steps. In step S10, whether there is a vehicle in an oncoming lane is determined. In step S20, whether to enable automatic startup is set. In step S30, whether to turn off glare prevention is determined. In step S40, if yes, glare prevention mode is entered.

Figure 5:
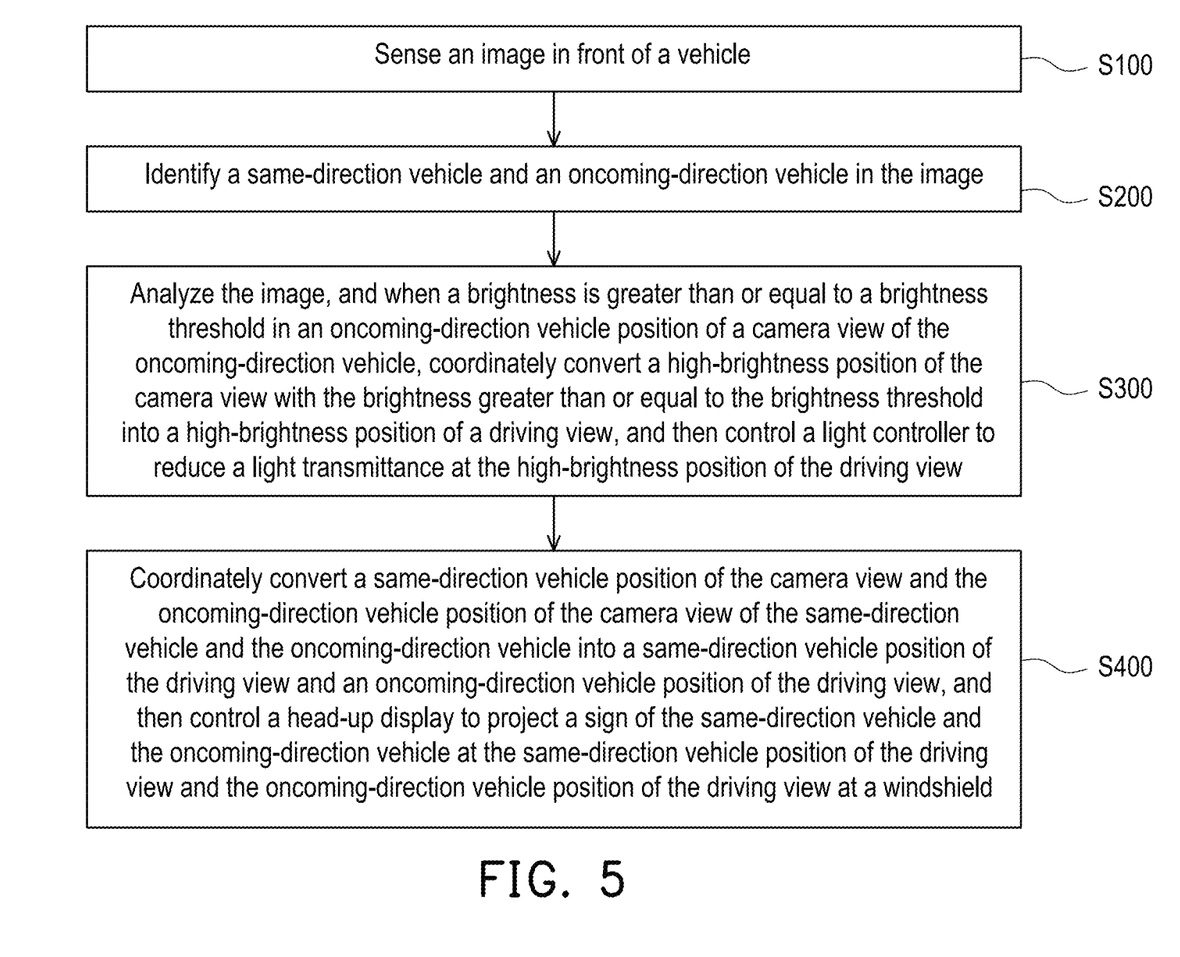
FIG. 5 is a detailed flowchart of step S40 in FIG. 4.

FIG. 5 is a detailed flowchart of step S40 in FIG. 4. Please refer to FIG. 5. In the present embodiment, step S40 includes the following steps. In step S100, the image IMG in front of the vehicle is sensed. In step S200, the same-direction vehicle SV and the oncoming-direction vehicle OV in the image IMG are identified. In step S300, the image IMG is analyzed, and when a brightness is greater than or equal to a brightness threshold in an oncoming-direction vehicle OV position of a camera view of the oncoming-direction vehicle, a high-brightness position of the camera view with the brightness greater than or equal to the brightness threshold is coordinately converted into a high-brightness position of a driving view, and then the light controller 400 is controlled to reduce a light transmittance at the high-brightness position of the driving view.

In the present embodiment, step S40 further includes the following steps. In step S400, a same-direction vehicle position of a camera view and an oncoming-direction vehicle position of the camera view of the same-direction vehicle SV and the oncoming-direction vehicle OV are coordinately converted into a same-direction vehicle position of a driving view and an oncoming-direction vehicle position of the driving view, and then the head-up display 500 is controlled to project a sign of the same-direction vehicle SV and the oncoming-direction vehicle OV at the same-direction vehicle position of the driving view and the oncoming-direction vehicle position of the driving view at the windshield WS.

Figure 6:
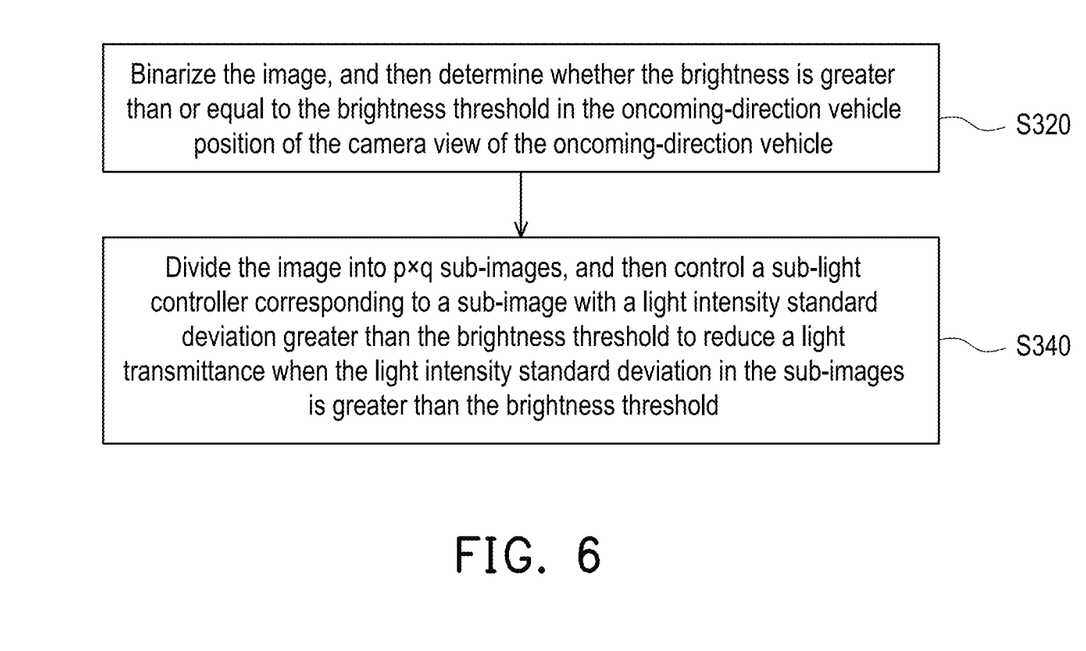
FIG. 6 is a detailed flowchart of step S300 in FIG. 5.

FIG. 6 is a detailed flowchart of step S300 in FIG. 5. Please refer to FIG. 6. In the present embodiment, step S300 further includes the following steps. In step S320, the image IMG is binarized, and then whether a brightness is greater than or equal to the brightness threshold in the oncoming-direction vehicle position of a camera view of the oncoming-direction vehicle OV is determined. In step S340, the image IMG is divided into p×q sub-images SIMG, and then the sub-light controller 420' corresponding to a sub-image SIMG' with a light intensity standard deviation greater than the brightness threshold is controlled to reduce a light transmittance when the light intensity standard deviation in the sub-images SIMG is greater than the brightness threshold.

Based on the above, in an embodiment of the invention, the driving system and the method to prevent glare thereof sense the image in front of the vehicle, and perform coordinate conversion when the brightness is greater than or equal to the brightness threshold in the oncoming-direction vehicle position of the camera view of the oncoming-direction vehicle by analyzing the image, and then control the light controller to reduce the light transmittance at the high-brightness position of the driving view. Therefore, the driving system and the method to prevent glare thereof may improve visual clarity while reducing visual interference from strong light, thereby providing the driver with clearer observation of road conditions and the surrounding environment. Since sudden light and dark changes in the view is reduced, the driver may respond more quickly to road and vehicle conditions, thereby reducing visual impairments and misjudgments, and thereby reducing the occurrence of traffic accidents. At the same time, in addition to reducing misjudgments, reducing strong light interference also alleviates mental stress caused by strong light, allowing the driver to drive with more focus and calmly, thus improving driving safety.

What is claimed is:

1. A driving system, configured to be disposed in a vehicle, comprising:
   a camera configured to sense an image in front of the vehicle;
   a first controller electrically connected to the camera and configured to identify a same-direction vehicle and an oncoming-direction vehicle in the image;
   a light controller configured to be disposed at a windshield of the vehicle; and
   a second controller electrically connected to the first controller and the light controller,
   wherein the second controller analyzes the image, and when a brightness is greater than or equal to a brightness threshold in an oncoming-direction vehicle position of a camera view of the oncoming-direction vehicle, coordinately converts a high-brightness position of the camera view with the brightness greater than or equal to the brightness threshold into a high-brightness position of a driving view, and then controls the light controller to reduce a light transmittance at the high-brightness position of the driving view,
   wherein the light controller comprises p×q sub-light controllers, wherein p≥2, and q≥2,
   wherein the second controller divides the image into p×q sub-images, and then controls the sub-light controller corresponding to the sub-image with a light intensity standard deviation greater than the brightness threshold to reduce a light transmittance when the light intensity standard deviation in the sub-images is greater than the brightness threshold,
   wherein:

$$\sigma = \sqrt{\frac{\sum_{x=1,y=1}^{n,m}(b(x, y) - \bar{m})^2}{nm}},$$

$$\bar{m} = \sqrt{\frac{\sum_{x=1,y=1}^{n,m}b(x, y)}{nm}},$$

wherein in each of the sub-images, σ is the light intensity standard deviation, b(x,y) is a light intensity of each pixel position, m̄ is an average light intensity, and n×m is a sum of pixel quantity.

2. The driving system of claim 1, further comprising:
a head-up display electrically connected to the second controller,
wherein the second controller coordinately converts a same-direction vehicle position of a camera view and an oncoming-direction vehicle position of the camera view of the same-direction vehicle and the oncoming-direction vehicle into a same-direction vehicle position of a driving view and an oncoming-direction vehicle position of the driving view, and then controls the head-up display to project a sign of the same-direction vehicle and the oncoming-direction vehicle at the same-direction vehicle position of the driving view and the oncoming-direction vehicle position of the driving view at the windshield.

3. The driving system of claim 1, wherein the second controller binarizes the image, and then determines whether a brightness is greater than or equal to the brightness threshold in the oncoming-direction vehicle position of the camera view of the oncoming-direction vehicle.

4. The driving system of claim 1, wherein the light controller is an electrochromic layer or an electrochromic glass.

5. A method to prevent glare in a driving system, comprising:
sensing an image in front of a vehicle;
identifying a same-direction vehicle and an oncoming-direction vehicle in the image; and
analyzing the image, and when a brightness is greater than or equal to a brightness threshold in an oncoming-direction vehicle position of a camera view of the oncoming-direction vehicle, coordinately converting a high-brightness position of the camera view with the brightness greater than or equal to the brightness threshold into a high-brightness position of a driving view, and then controlling a light controller to reduce a light transmittance at the high-brightness position of the driving view,
wherein the step of analyzing the image, and when the brightness is greater than or equal to the brightness threshold in the oncoming-direction vehicle position of the camera view of the oncoming-direction vehicle, coordinately converting the high-brightness position of the camera view with the brightness greater than or equal to the brightness threshold into the high-brightness position of the driving view, and then controlling the light controller to reduce the light transmittance at the high-brightness position of the driving view comprises:

dividing the image into p×q sub-images, and then controlling the sub-light controller corresponding to the sub-image with a light intensity standard deviation greater than the brightness threshold to reduce a light transmittance when the light intensity standard deviation in the sub-images is greater than the brightness threshold,
wherein:

$$\sigma = \sqrt{\frac{\sum_{x=1,y=1}^{n,m}(b(x,y)-\bar{m})^2}{nm}},$$

$$\bar{m} = \sqrt{\frac{\sum_{x=1,y=1}^{n,m}b(x,y)}{nm}},$$

wherein in each of the sub-images, σ is the light intensity standard deviation, b(x,y) is a light intensity of each pixel position, m̄ is an average light intensity, and n×m is a sum of pixel quantity.

6. The method to prevent glare in the driving system of claim 5, further comprising:
coordinately converting a same-direction vehicle position of a camera view and an oncoming-direction vehicle position of the camera view of the same-direction vehicle and the oncoming-direction vehicle into a same-direction vehicle position of a driving view and an oncoming-direction vehicle position of the driving view, and then controlling a head-up display to project a sign of the same-direction vehicle and the oncoming-direction vehicle at the same-direction vehicle position of the driving view and the oncoming-direction vehicle position of the driving view at a windshield.

7. The method to prevent glare in the driving system of claim 5, wherein the step of analyzing the image, and when the brightness is greater than or equal to the brightness threshold in the oncoming-direction vehicle position of the camera view of the oncoming-direction vehicle, coordinately converting the high-brightness position of the camera view with the brightness greater than or equal to the brightness threshold into the high-brightness position of the driving view, and then controlling the light controller to reduce the light transmittance at the high-brightness position of the driving view comprises:
binarizing the image, and then determining whether a brightness is greater than or equal to the brightness threshold in the oncoming-direction vehicle position of the camera view of the oncoming-direction vehicle.

\* \* \* \* \*